United States Patent
Takechi

(10) Patent No.: US 11,057,560 B2
(45) Date of Patent: Jul. 6, 2021

(54) IMAGE PICKUP APPARATUS, IMAGE PICKUP METHOD, AND RECORDING MEDIUM

(71) Applicant: CANON KABUSHIKI KAISHA, Tokyo (JP)

(72) Inventor: Koki Takechi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/786,388

(22) Filed: Feb. 10, 2020

(65) Prior Publication Data
US 2020/0267316 A1    Aug. 20, 2020

(30) Foreign Application Priority Data
Feb. 18, 2019 (JP) .............................. JP2019-026720

(51) Int. Cl.
| | | |
|---|---|---|
| H04N 5/232 | (2006.01) | |
| H04N 5/225 | (2006.01) | |
| G06T 5/00 | (2006.01) | |
| G06T 5/50 | (2006.01) | |
| G02B 7/28 | (2021.01) | |

(52) U.S. Cl.
CPC ..... *H04N 5/23229* (2013.01); *H04N 5/23293* (2013.01)

(58) Field of Classification Search
CPC ........... H04N 5/23229; H04N 5/23293; H04N 5/23212; H04N 5/23216; H04N 5/23222; H04N 5/23239; H04N 5/23296; H04N 5/2259; G06T 5/00; G06T 5/003; G06T 2207/10016; G06T 2207/10024; G06T 2207/10148; G02B 7/28

USPC ....... 348/239, 326, 341, 345, 346, 263, 277, 348/95, 745, 806; 382/255, 254, 151, 382/284, 294
See application file for complete search history.

(56) References Cited

U.S. PATENT DOCUMENTS

| | | | | |
|---|---|---|---|---|
| 10,282,825 | B2* | 5/2019 | Abe .......................... | G06T 5/50 |
| 2010/0271498 | A1* | 10/2010 | Hwang .................. | H04N 5/228 |
| | | | | 348/222.1 |
| 2014/0267833 | A1* | 9/2014 | Chen ......................... | G06T 5/00 |
| | | | | 382/167 |
| 2016/0028948 | A1* | 1/2016 | Omori ..................... | H04N 5/232 |
| | | | | 348/239 |
| 2016/0191784 | A1* | 1/2016 | Murayama ......... | H04N 5/23212 |
| | | | | 348/347 |
| 2018/0252894 | A1* | 9/2018 | Jespersen ................. | G02B 7/28 |

FOREIGN PATENT DOCUMENTS

| | | |
|---|---|---|
| JP | 10-290389 A | 10/1998 |
| JP | 2015-127772 A | 7/2015 |
| JP | 2018-46543 A | 3/2018 |

\* cited by examiner

*Primary Examiner* — Marly S Camargo
(74) *Attorney, Agent, or Firm* — Canon U.S.A., Inc. IP Division

(57) ABSTRACT

An image pickup apparatus includes an image pick-up unit configured to pick up a plurality of first images and at least one second image, a combining unit configured to extract a focused part from each of the plurality of first images to generate a first composite image, and a display configured to display the first composite image, wherein the combining unit further extracts focused parts from the first composite image and the at least one second image to generate a second composite image.

17 Claims, 7 Drawing Sheets

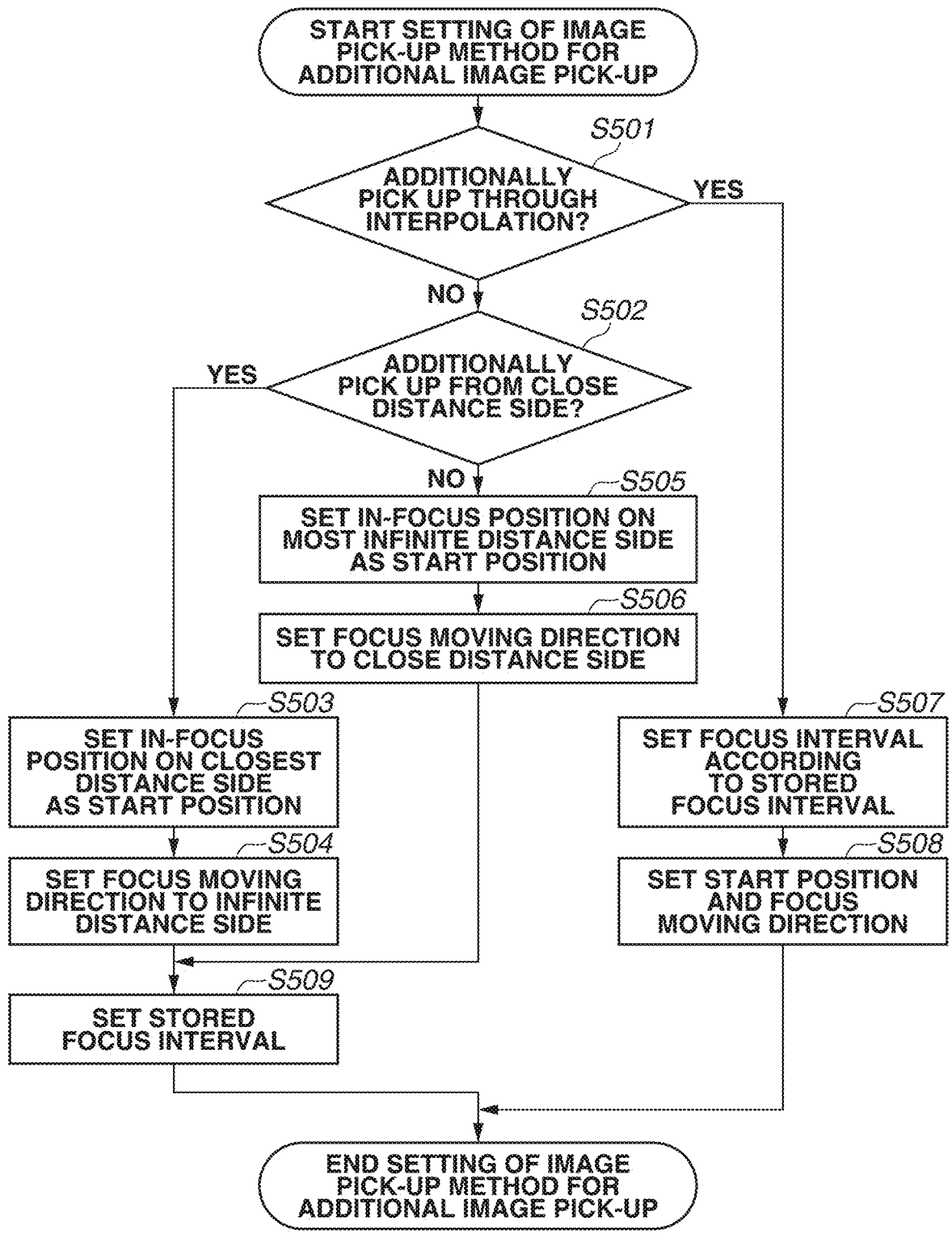

IMAGE PICKUP APPARATUS, IMAGE PICKUP METHOD, AND RECORDING MEDIUM

BACKGROUND OF THE INVENTION

Field of the Invention

The aspect of the embodiments relates to an image pickup apparatus that picks up a plurality of images with different in-focus positions.

Description of the Related Art

In a case where an image of a plurality of subjects that are positioned at significantly different distances from an image pickup apparatus such as a digital camera is to be picked up or a case where an image of a subject that is long in a depth direction is to be picked up, only some of the subjects may be in focus due to an insufficient depth of field. Alternatively, in a case where it is to acquire an image with a very high perceived resolution, the image should be picked up with a shallow depth of field, and thus the entire subject may not be in the depth of field. As a solution to this situation, Japanese Patent Application Laid-Open No. H10-290389 discusses a so-called depth composition technology in which a plurality of images with different in-focus positions is picked up, only in-focus areas are extracted from each of the images to combine the images into one image, and thereby a composite image in which all imaging areas are in focus is generated.

However, in the depth composition technology discussed in Japanese Patent Application Laid-Open No. H10-290389, since the depth of field is expanded in the composite processing, it is not possible to verify before picking up images whether the depth of field is expanded. It is therefore hard to obtain an expected composite image unless a user predicts a result of depth composition when the user picks up the images and sets the number of images to be picked-up and a variation of in-focus positions to appropriate values. Once an unexpected composite image is generated, there is no choice but to pick up images again from the beginning and the image that has been already combined becomes useless.

SUMMARY OF THE INVENTION

According to an aspect of the embodiments, an apparatus includes an image pick-up unit configured to pick up a plurality of first images and at least one second image, at least a part of angles of view of the plurality of first images overlapping each other, a combining unit configured to extract a focused part from each of the plurality of first images to generate a first composite image, and a display configured to display the first composite image, wherein the combining unit further extracts focused parts from the first composite image and the at least one second image to generate a second composite image.

Further features of the disclosure will become apparent from the following description of exemplary embodiments with reference to the attached drawings.

BRIEF DESCRIPTION OF THE DRAWINGS

FIG. 5 is a flowchart for describing the setting of an image pick-up method for additional image pick-up according to the exemplary embodiment of the disclosure.

DESCRIPTION OF THE EMBODIMENTS

An exemplary embodiment of the disclosure will be described in detail with reference to the accompanying drawings.

Figure 1:
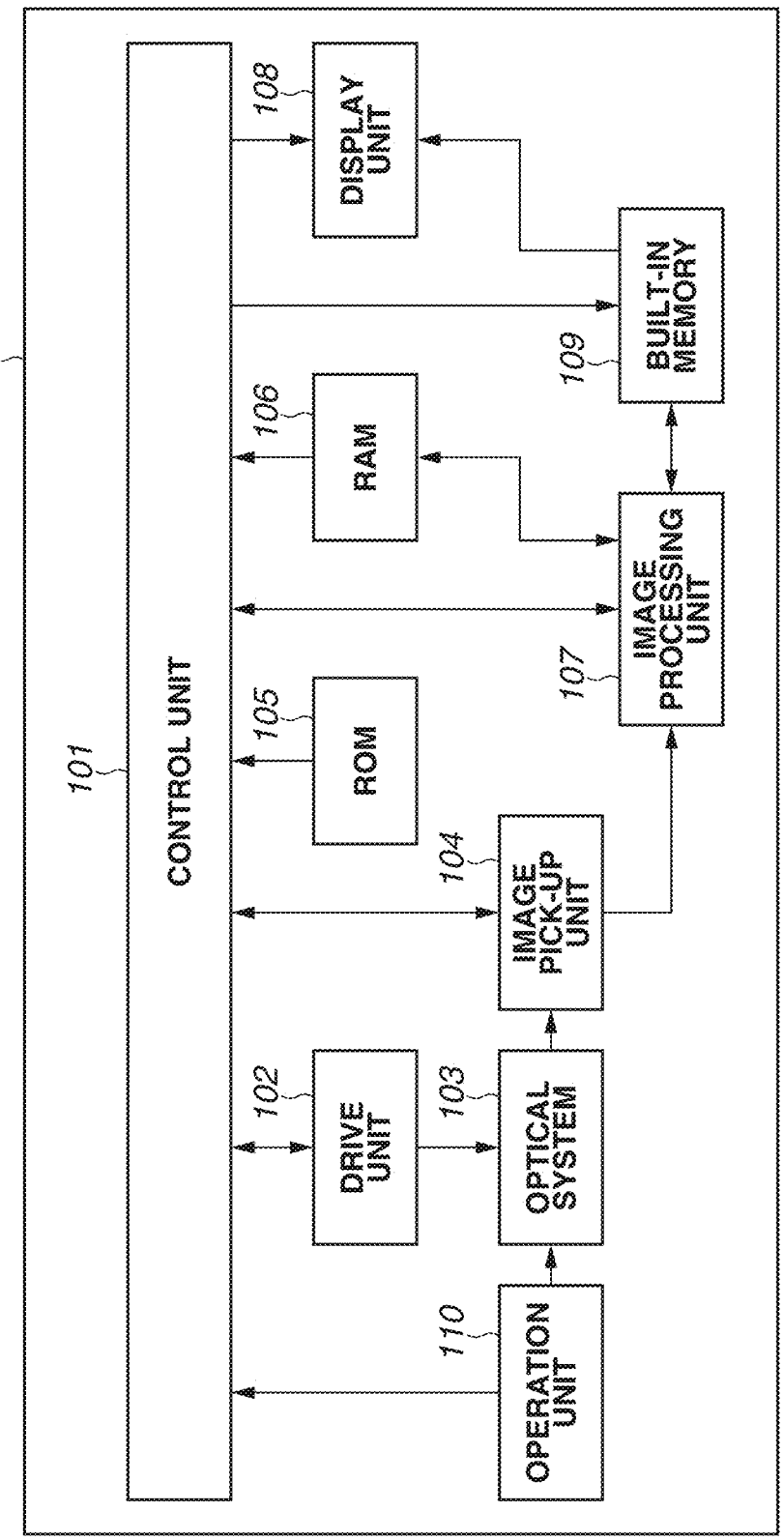
FIG. 1 is a block diagram illustrating a hardware configuration of a digital camera according to an exemplary embodiment of the disclosure.

FIG. 1 is a block diagram illustrating a hardware configuration of a digital camera according to the present exemplary embodiment. The digital camera 100 can pick up still images, record information about in-focus positions, and calculate contrast values and combine images as well. The digital camera 100 can enlarge or reduce picked-up and stored images, or images input from the outside.

A control unit 101 is a signal processor, such as a central processing unit (CPU) or a micro-processing unit (MPU), and controls each part of the digital camera 100 while reading out in advance a program stored in a read-only memory (ROM) 105, which will be described below. For example, as will be described below, the control unit 101 issues instructions on a start and an end of image pick-up to an image pick-up unit 104, which will be described below. Alternatively, the control unit 101 issues an instruction on image processing to an image processing unit 107, which will be described below, on the basis of a program stored in the ROM 105. An instruction from a user is input to the digital camera 100 by an operation unit 110, which will be described below, and reaches each part of the digital camera 100 via the control unit 101.

A drive unit 102 includes a motor and the like and causes an optical system 103, which will be described below, to mechanically operate under an instruction of the control unit 101. For example, the drive unit 102 moves a position of a focus lens included in the optical system 103 to adjust an in-focus position of the optical system 103 on the basis of an instruction of the control unit 101.

The optical system 103 includes a zoom lens, the focus lens, an aperture, and the like. The aperture is a mechanism that adjusts a quantity of transmitted light. An in-focus position can be changed by changing a position of the lens.

The image pick-up unit 104 is a photoelectric conversion element that photoelectrically converts a signal of incident light into an electrical signal. For example, a charge coupled device (CCD) sensor, a complementary metal-oxide semiconductor (CMOS) sensor, or the like can be applied to the image pick-up unit 104. The image pick-up unit 104 has a moving image capturing mode in which a plurality of images that are consecutive in time can be picked up as frames of a moving image.

The ROM 105 is a non-volatile memory dedicated to readout as a memory medium storing not only operation programs of each block of the digital camera 100 but also parameters for operations of each block and the like. A random access memory (RAM) 106 is a rewritable volatile memory used as a transitory storage area of data output in operations of each block of the digital camera 100.

An image processing unit 107 performs various kinds of image processing such as white balance adjustment, color interpolation, and filtering on an image output from the image pick-up unit 104 or data of image signals recorded in a built-in memory 109, which will be described below. The image processing unit 107 performs compression processing on data of signals of images picked up by the image pick-up unit 104 in the standard of Joint Photographic Experts Group (JPEG), or the like.

The image processing unit 107 includes an application-specific integrated circuit (ASIC) in which circuits for specific processing are gathered. Alternatively, the control unit 101 may also perform some or all of the functions of the image processing unit 107 when the control unit 101 performs processing according to a program read out from the ROM 105. In a case where the control unit 101 performs all of the functions of the image processing unit 107, the control unit 101 does not need to have the image processing unit 107 as hardware.

Specifically, as composite processing, the image processing unit 107 can perform additive combining processing, weighted additive combining processing, and the like. A pixel value of each piece of image data yet to be combined is referred to as $I\_i(x, y)$ (i=1 to N; x and y indicate coordinates on a screen), and a pixel value of a combined image obtained by combining N images is referred to as $I(x, y)$. The pixel value may be set to a value of each signal of R, G1, and G2, and B of a Bayer array output after automatic white balancing (AWB) is performed, or a value of a luminance signal (luminance value) obtained from a group of signals of R, G1, G2, and B. At this time, a luminance value may be calculated for each pixel after signals of the Bayer array are interpolated so that the signals of R, G, and B are present in each pixel. A luminance value is calculated using, for example, the Formula 1 as follows:

$$Y=0.3\times R+0.59\times G+0.11\times B \quad \text{(Formula 1)}$$

Alignment processing or the like is performed on a plurality of pieces of image data if necessary and each of associated pixel values is processed according to the formulas described below.

In the additive combining processing, the pixel value can be calculated using the Formula 2 as follows:

$$I(x,y)=I\_1(x,y)+I\_2(x,y)+\ldots+I\_N(x,y) \quad \text{(Formula 2)}$$

In weighted additive combining processing, the pixel value can be calculated using the Formula 3, with ak as a weighting coefficient, as follows:

$$I(x,y)=(a1\times I\_1(x,y)+a2\times I\_2(x,y)+\ldots+aN\times I\_N(x,y))/N \quad \text{(Formula 3)}$$

A display unit 108 is a liquid crystal display, an organic electro-luminescence (EL) display, or the like for displaying an image temporarily stored in the RAM 106 or an image stored in the built-in memory 109, which will be described below, a setting screen of the digital camera 100, or the like.

The built-in memory 109 is a place in which images picked up by the image pick-up unit 104 or images processed by the image processing unit 107, information about an in-focus position at the time of image pick-up, and the like are recorded. A memory card or the like may be used instead of the built-in memory.

The operation unit 110 is, for example, a button, a switch, a key, a mode dial or the like attached to the digital camera 100, a touch panel that is also used as the display unit 108, or the like. An instruction from a user is delivered to the control unit 101 via the operation unit 110.

Figure 2:
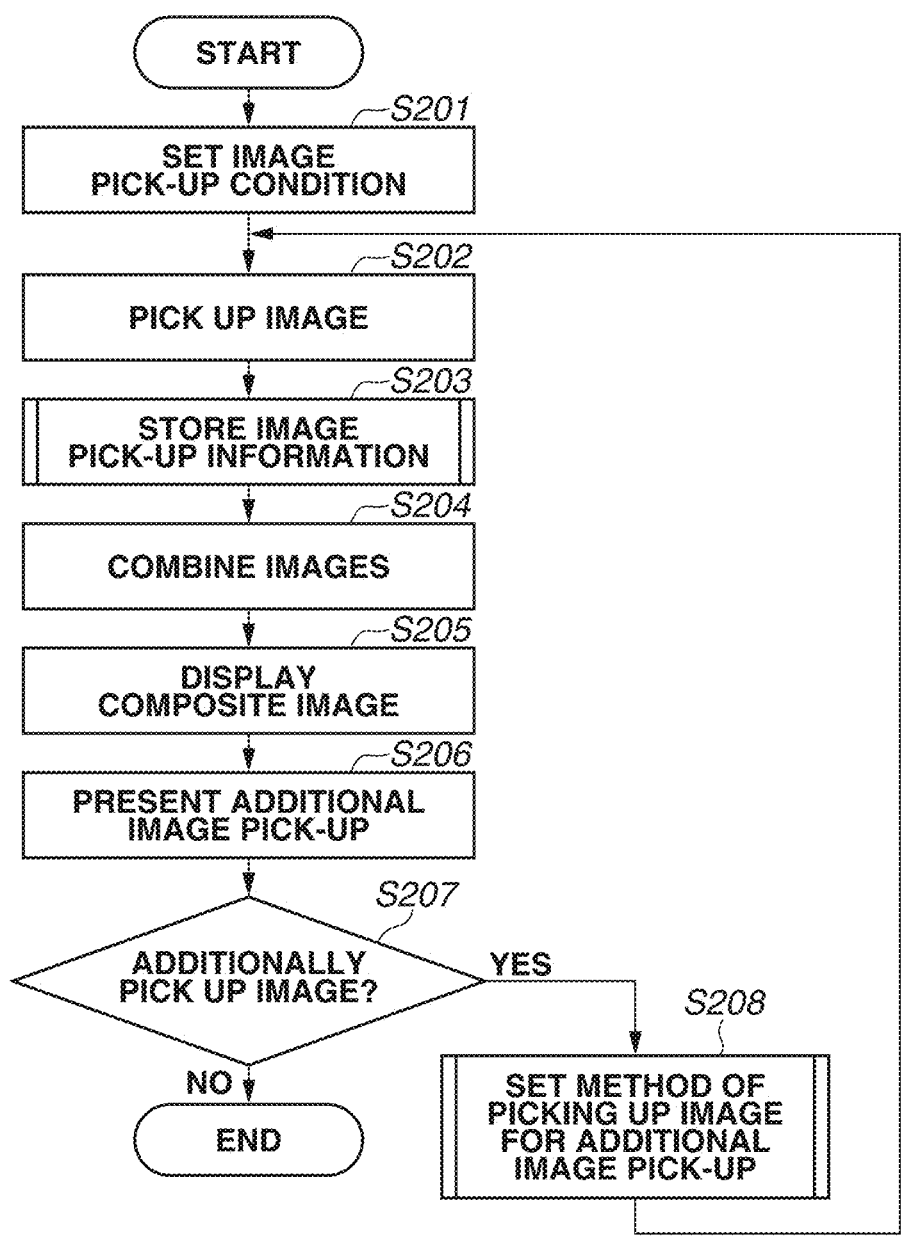
FIG. 2 is a flowchart for describing generation of a composite image according to the exemplary embodiment of the disclosure.

FIG. 2 is a flowchart for describing generation of a composite image according to the present exemplary embodiment.

In step S201, the control unit 101 makes a setting for picking up an image on the basis of an instruction from a user. The instruction from the user is delivered to the control unit 101 via the operation unit 110. Settings for picking up an image mentioned here include, for example, an in-focus position at which a first image is picked up, an in-focus position movement interval between images when a second image and subsequent images are picked up, the number of images to be picked-up, and the like. An example of a user operation includes an operation performed by the user for designating an in-focus position on the touch panel and setting a plurality of in-focus positions at predetermined focus intervals from the in-focus position as a center using the control unit 101.

In step S202, the control unit 101 performs control such that the image pick-up unit 104 picks up images at each of the in-focus positions while changing focus of the lenses included in the optical system 103 of the digital camera 100 to each of the in-focus positions set in step S201. Although the settings other than the focus of the digital camera 100 are not changed while the images are picked up, the angle of view of the picked-up images slightly is changed when the in-focus positions are varied.

In step S203, the control unit 101 stores image pick-up information of step S201 such as the in-focus positions, the in-focus position movement interval, and the number of images to be picked up. Storage of the image pick-up information will be described below in detail.

In step S204, the image processing unit 107 performs depth composition on the images picked up by the image pick-up unit 104 in step S202.

An example of a depth composition method will be described. First, the control unit 101 calculates an amount of a position shift of two images to be combined. An example of the calculation method will be described below. The control unit 101 sets a plurality of blocks in one image. In one embodiment, the control unit 101 sets sizes of the blocks to be equal. The control unit 101 sets wider ranges than the blocks at the same positions as each of the set blocks in the other image as search ranges. Finally, the control unit 101 calculates correspondence points in each of search ranges of the other image, at which the sum of absolute differences (which will be referred to as an SAD below) in luminance from the initially set blocks has a minimum value. The control unit 101 calculates a position shift as a vector using the center of the initially set blocks and the above-described correspondence points. The control unit 101 may use the sum of squared differences (which will be referred to as an SSD below), a normalized cross correlation (which will be referred to as an NCC below), or the like, in addition to the SAD in the calculation of the above-described correspondence points.

The control unit 101 calculates a transformation coefficient from the amount of the position shift. As the transformation coefficient, the control unit 101 uses, for example, a projective transformation coefficient. However, a transformation coefficient is not limited to a projective transformation coefficient, and a simplified transformation coefficient only of an affine transformation coefficient or a horizontal/vertical shift may be used.

The control unit 101 can perform deformation using the formula indicated in the Formula 4 as follows:

$$I' = \begin{pmatrix} x' \\ y' \\ 1 \end{pmatrix} = AI = \begin{pmatrix} a & b & c \\ d & e & f \\ g & h & i \end{pmatrix} \begin{pmatrix} x \\ y \\ 1 \end{pmatrix} \quad \text{(Formula 4)}$$

In the Formula 4, (x', y') represents coordinates after deformation is performed, and (x, y) represents coordinates before deformation is performed.

The image processing unit 107 calculates a contrast value of each of aligned images. As an example of the contrast value calculation method, for example, the image processing unit 107 calculates luminance Y using the following Formula 5 from color signals Sr, Sg, and Sb of each of pixels:

$$Y = 0.299Sr + 0.587Sg + 0.114Sb \quad \text{(Formula 5)}$$

A contrast value I is calculated using a Sobel filter in a matrix L of the luminance Y of 3×3 pixels as indicated in the Formula 6 to the Formula 8 as follows:

$$I_h = \begin{pmatrix} -1 & 0 & 1 \\ -2 & 0 & 2 \\ -1 & 0 & 1 \end{pmatrix} \cdot L \quad \text{(Formula 6)}$$

$$I_v = \begin{pmatrix} -1 & -2 & -1 \\ 0 & 0 & 0 \\ 1 & 2 & 1 \end{pmatrix} \cdot L \quad \text{(Formula 7)}$$

$$I = \sqrt{I_h^2 + I_v^2} \quad \text{(Formula 8)}$$

The above-described contrast value calculation method is merely an example, and for example, an edge detection filter such as a Laplacian filter or a band-pass filter that allows passage in a predetermined band can also be used as a filter to be used.

The image processing unit 107 generates a composition map. As a composition map generation method, the image processing unit 107 compares the contrast values of pixels at the same position in each of images, sets a composition ratio of pixels having the highest contrast value to 100%, and sets a composition ratio of pixels at positions other than the same position to 0%. The image processing unit 107 sets such composition ratios for all positions of the images.

The image processing unit 107 replaces pixels according to the composition map to generate a composite image. If the composition ratio of adjacent pixels calculated as described above is changed from 0% to 100% (or changed from 100% to 0%), unnaturalness stands out at the composition boundaries. For this reason, a filter with a predetermined number of pixels (the number of taps) is applied to the composition map to prevent the composition ratio of the adjacent pixels from abruptly changing.

In step S205, the display unit 108 displays the composite image generated in step S204.

In step S206, the display unit 108 presents presence or absence of additional image pick-up and methods of additional image pick-up, and prompts the user to make a selection.

Figure 3:
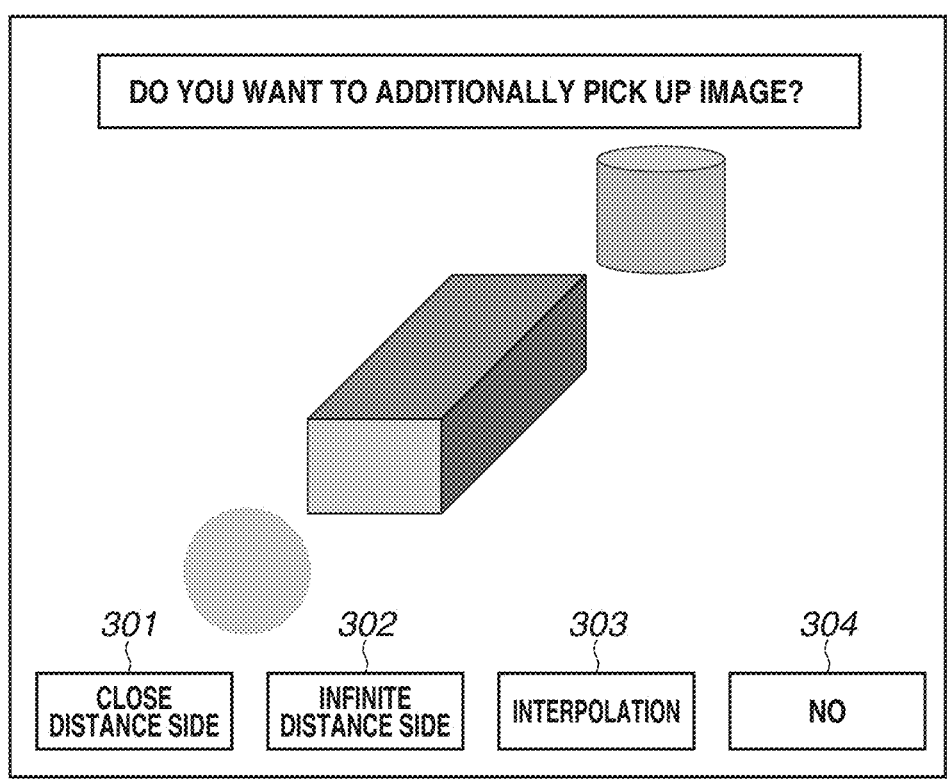
FIG. 3 is a diagram for describing an example of presentation of additional image pick-up according to the exemplary embodiment of the disclosure.

FIG. 3 is a diagram for describing an example of presentation of additional image pick-up according to the present exemplary embodiment. In step S206, for example, the display unit 108 prompts a user to select additional image pick-up by displaying a screen as illustrated in FIG. 3. In FIG. 3, the display unit 108 displays buttons 301 to 304 together with the composite image displayed in step S205. The buttons 301 to 304 indicate "additional image pick-up on a close distance side", "additional image pick-up on an infinite distance side", "additional image pick-up with interpolation at an in-focus position", and "no additional image pick-up", respectively. When the user touches any of the buttons 301 to 304 on the touch panel that is also used as the display unit 108, a method for additional image pick-up or no operation of additional image pick-up is selected.

The above is merely an example, and the user can be allowed to select additional image pick-up using any of other various methods. For example, after the display unit 108 displays the composite image in advance in step S205, the display unit may display the buttons 301 to 304 without displaying the composite image in step S206. Alternatively, the display unit 108 may display buttons of "perform additional image pick-up" and "no additional image pick-up" in advance and display the buttons of "additional image pick-up on a close distance side", "additional image pick-up on an infinite distance side", and "additional image pick-up with interpolation at an in-focus position" after the button of "perform additional image pick-up" is selected.

In step S207, the control unit 101 determines whether to perform additional image pick-up on the basis of an instruction from the user. In a case where no additional image pick-up is performed (NO in step S207), the flow of FIG. 2 ends. In a case where additional image pick-up is performed (YES in step S207), the processing proceeds to step S208, and the control unit 101 sets an image pick-up method for additional image pick-up. Details of the setting of the image pick-up method for additional image pick-up will be described below.

Figure 4:
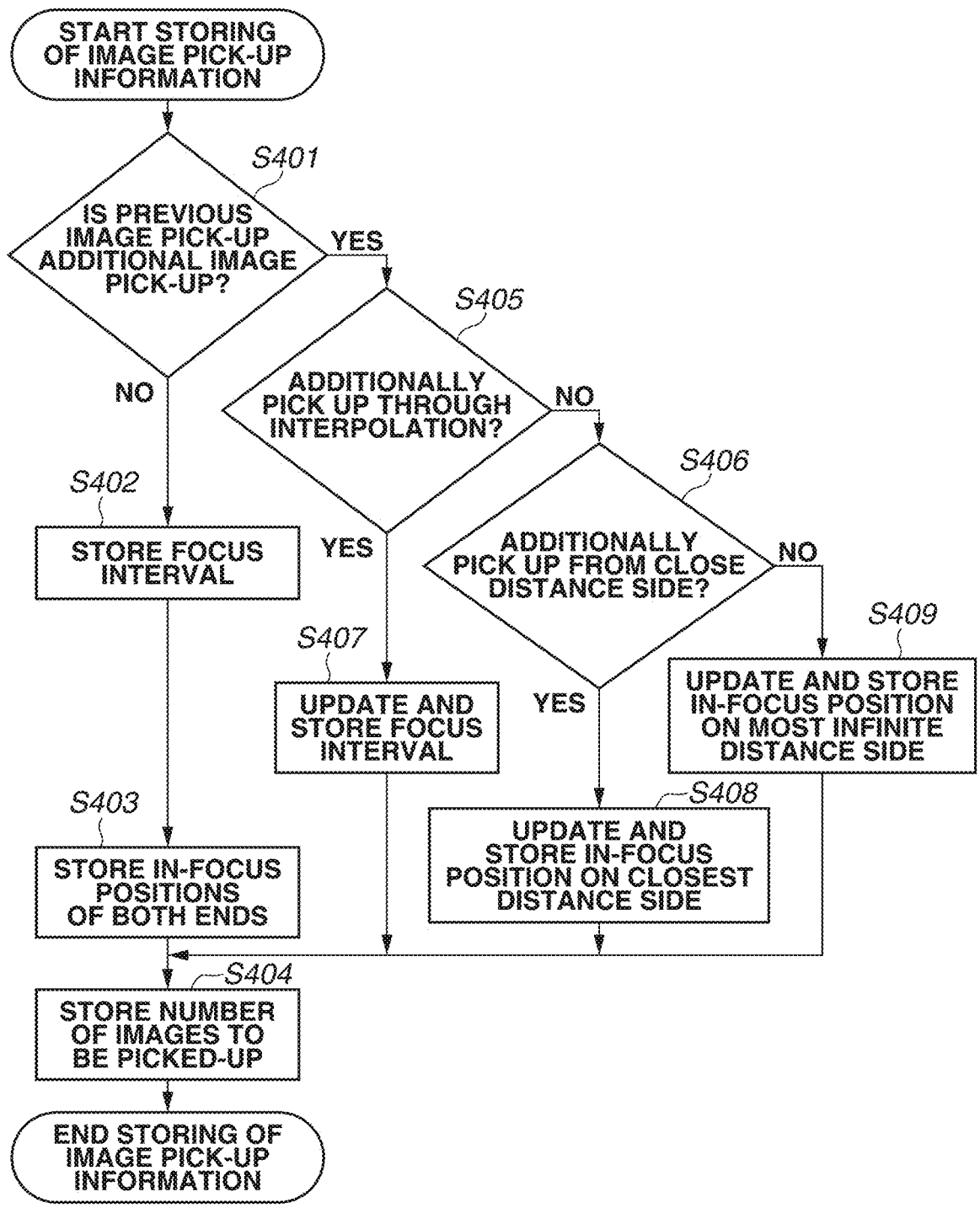
FIG. 4 is a flowchart for describing storage of the image pick-up information according to the exemplary embodiment of the disclosure.

Storage of the image pick-up information in step S203 will be described. FIG. 4 is a flowchart for describing storage of the image pick-up information according to the present exemplary embodiment.

When processing of storing the image pick-up information starts, in step S401, the control unit 101 determines whether the previous image pick-up in step S202 is first image pick-up or additional image pick-up. If the previous image pick-up is first image pick-up (NO in step S401), the processing proceeds to step S402, the control unit 101 stores the focus interval at the time of the image pick-up, and in step S403, the control unit 101 stores the in-focus position on the closest distance side and the in-focus position on the most infinite distance side among in-focus positions of the image pick-up. The processing proceeds to step S404, and the control unit 101 stores the number of images to be picked up.

On the other hand, if the previous image pick-up is additional image pick-up in step S401 (YES in step S401), the processing proceeds to step S405.

In step S405 and step S406, the control unit 101 determines a method for the previous additional image pick-up. In step S405, the control unit 101 determines whether the method for the previous additional image pick-up is addition by interpolation. If the method is addition by interpolation (YES in step S405), the processing proceeds to step S407, and if the method is not addition by interpolation (NO in step S405), the processing proceeds to step S406. In step S406, the control unit 101 further determines whether the method for the previous additional image pick-up is addition from a close distance side. If the method is addition from a close distance side (YES in step S406), the processing proceeds to step S408, and if the method is not addition from a close distance side, that is, if the method is addition from an infinite distance side (NO in step S406), the processing proceeds to step S409.

In step S407, the control unit 101 updates and stores the stored focus interval. In step S408, the control unit 101 updates and stores the stored in-focus position on the closest distance side. In step S409, the control unit 101 updates and stores the stored in-focus position on the most infinite distance side. After any of step S407 to step S409, the processing proceeds to step S404, and the control unit 101 stores the number of images to be picked up.

In step S404, the number of images to be picked up stored by the control unit 101 can be calculated using the number of in-focus positions set later, and at that time, the number of images to be picked up may not be stored in step S404.

Setting of an image pick-up method for additional image pick-up of step S208 will be described. FIG. 5 is a flowchart for describing the setting of an image pick-up method for additional image pick-up according to the present exemplary embodiment. In step S501, the control unit 101 determines whether the method for additional image pick-up is addition by interpolation. If the method is addition by interpolation (YES in step S501), the processing proceeds to step S507, and if the method is not addition by interpolation (NO in step S501), the processing proceeds to step S502.

In the case where additional image pick-up is performed using interpolation, in step S507, the control unit 101 sets the focus interval stored in the previous image pick-up to be used as a focus interval of the additional image pick-up. In step S508, the control unit 101 determines an in-focus position for a start of the additional image pick-up and a focus moving direction. For example, the control unit 101 determines any of in-focus positions at both ends among added in-focus positions as an in-focus position for a start and determines a focus moving direction accordingly.

In step S502, the control unit 101 determines whether a method for the additional image pick-up is addition from a close distance side. If the method is addition from a close distance side (YES in step S502), the processing proceeds to step S503, and if the method is not addition from a close distance side, that is, if the method is addition from an infinite distance side (NO in step S502), the processing proceeds to step S505.

If the method for the additional image pick-up is addition from a close distance side, in step S503, the control unit 101 sets an in-focus position on the closest distance side among in-focus positions at which a start position of the additional image pick-up is added. An example of a method of determining the in-focus position on the closest distance side mentioned here will be described. For example, the user observes the composite image, gives an instruction of the location corresponding to the limit to which a depth of field is to be extended, sets an in-focus position on the closest distance side to the location, and sets the in-focus position as a start position of the additional image pick-up. In step S504, the control unit 101 sets a focus moving direction of the additional image pick-up from the close distance side to the infinite distance side. The processing proceeds to step S509, and the control unit 101 sets the stored focus interval as a focus interval for the additional image pick-up. That is, the control unit 101 makes the focus interval of the additional image pick-up equal to the focus interval of the previous image pick-up.

If the method for the additional image pick-up is addition from an infinite distance side, in step S505, the control unit 101 sets an in-focus position on the most infinite distance side among in-focus positions at which a start position of the additional image pick-up is added. For example, in a similar way, the user observes the composite image, gives an instruction of the location corresponding to the limit to which a depth of field is to be extended, sets an in-focus position on the most infinite distance side to the location, and sets the in-focus position as a start position of the additional image pick-up. In step S506, the control unit 101 sets a focus moving direction of the additional image pick-up from the infinite distance side to the close distance side. The processing proceeds to step S509, and the control unit 101 sets the stored focus interval as a focus interval for the additional image pick-up. In other words, the control unit 101 makes the focus interval of the additional image pick-up equal to the focus interval of the previous image pick-up.

In the above description, the focus moving direction may be reversed. Although the focus interval of the additional image pick-up is set to be equal to that of the previous image pick-up here, the configuration is not limited thereto and may be appropriately changed according to a situation. For example, if an object of which perceived resolution is to be particularly improved is in a focus range of additional image pick-up, focus intervals may be set to be narrower.

The setting of the image pick-up method for additional image pick-up of step S208 is as described above.

Scenes of image pick-up according to the present exemplary embodiment will be described with examples using diagrams below.

Figure 6A:
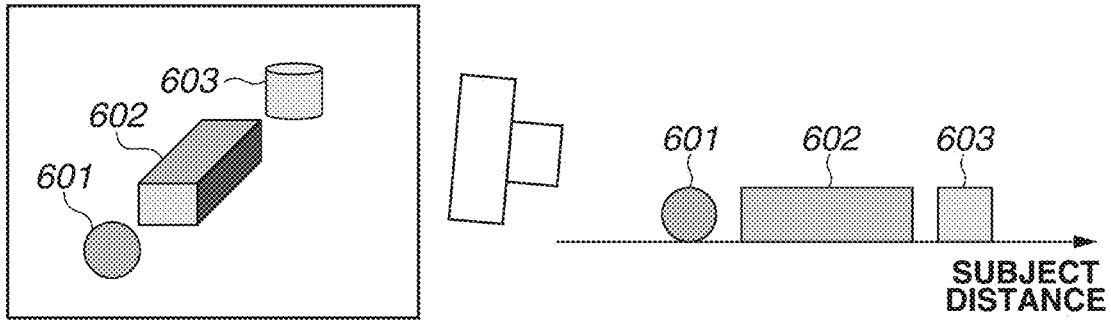
FIGS. 6A to 6C are diagrams for describing image pick-up according to the exemplary embodiment of the disclosure.
Figure 6B:
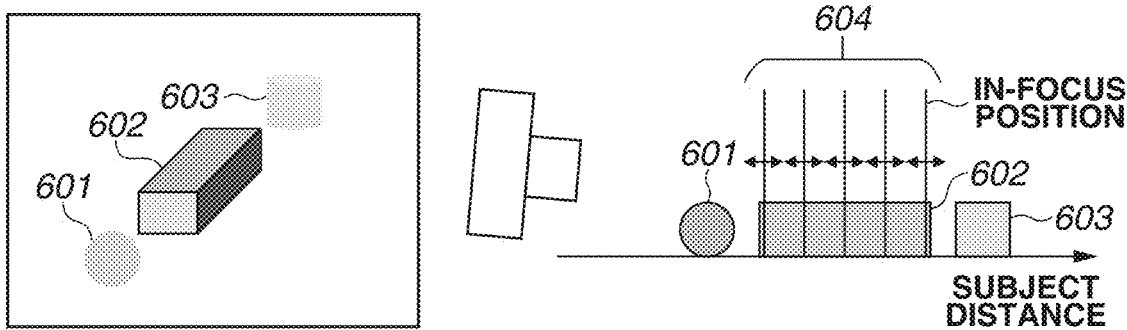
Figure 6C:
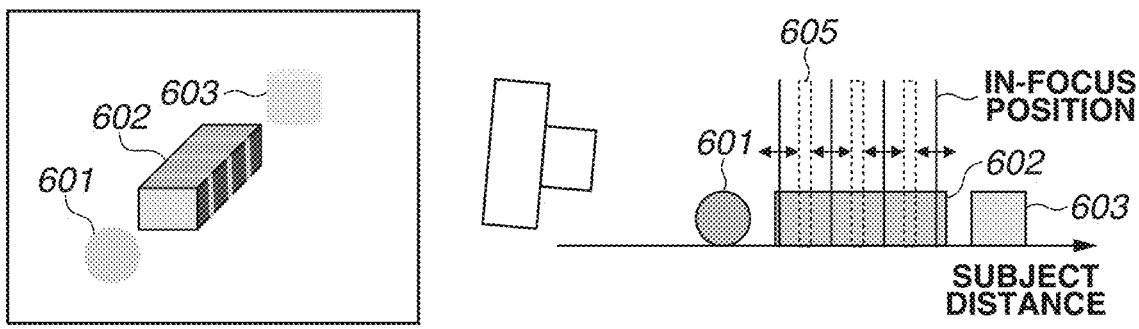

FIGS. 6A to 6C are diagrams for describing image pick-up according to the present exemplary embodiment.

FIG. 6A illustrates that the digital camera faces three subjects 601, 602, and 603 at different distances in the optical axis direction and the display unit 108 displays the subjects 601, 602, and 603.

FIG. 6B illustrates a state in which the digital camera picks up an image at a plurality of in-focus positions 604, performs depth composition, and generates a composite image. Since the plurality of in-focus positions 604 is not placed between the subject 601 and the subject 603, the subject 601 and the subject 603 are blurred in the composite image.

FIG. 6C illustrates a state in which the digital camera picks up an image at a plurality of in-focus positions, performs depth composition, and generates a composite image. Since distances between the plurality of in-focus positions are longer than each depth of field, out-of-focus ranges 605 are generated. In the composite image, a part of the subject 602 is blurry.

Figure 7A:
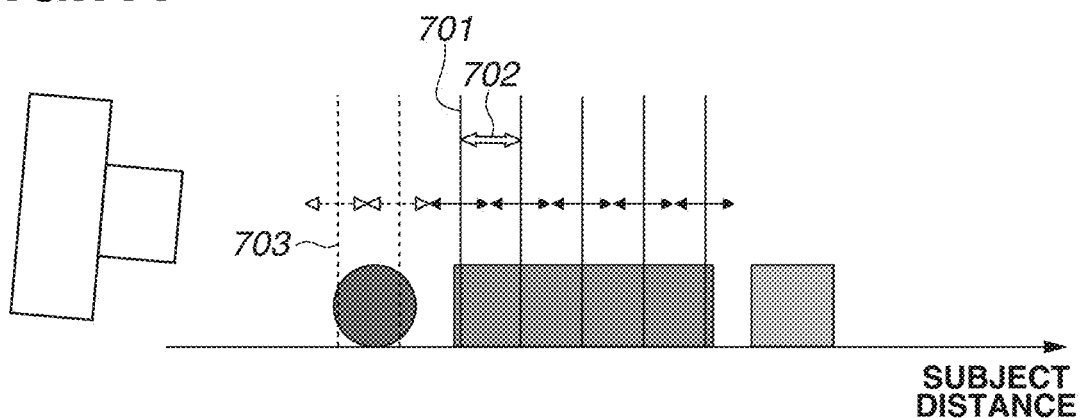
FIGS. 7A to 7C are diagrams for describing additional image pick-up according to the exemplary embodiment of the disclosure.
Figure 7B:
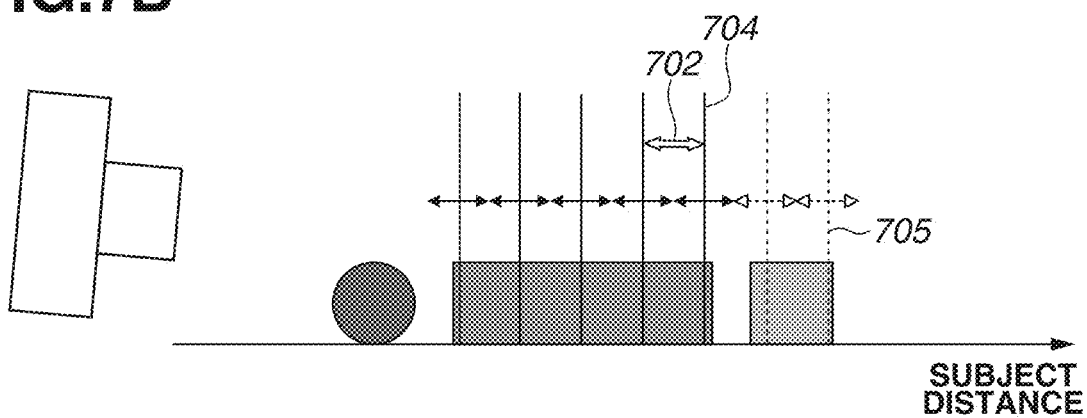
Figure 7C:
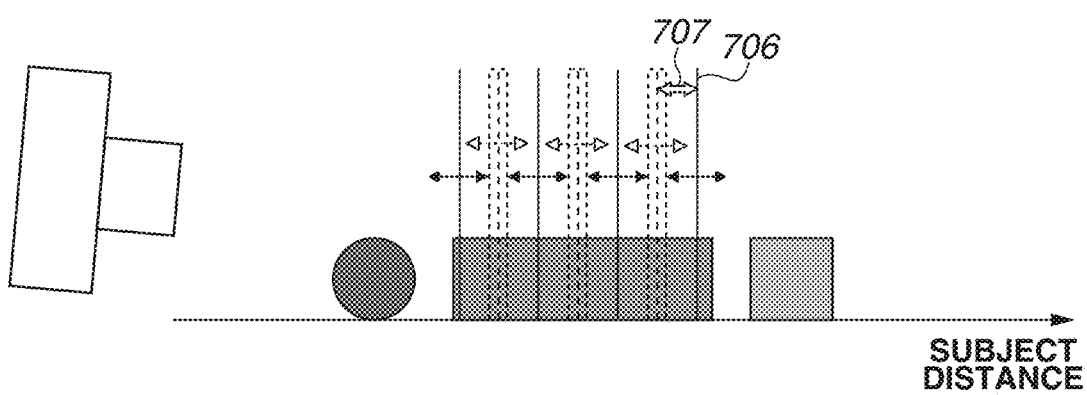

FIGS. 7A to 7C are diagrams for describing additional image pick-up according to the present exemplary embodiment.

FIG. 7A illustrates a state of additional image pick-up on a close distance side for obtaining a composite image in which the subject 601 is also in focus. The control unit 101 sets an in-focus position for additional image pick-up at a position on a closer distance side than an in-focus position 701. Specifically, considering the position of the subject 601, the control unit 101 sets an in-focus position 703 on a closest distance side to the subject and then sets an in-focus position of another operation of additional image pick-up such that the focus interval between the second in-focus position and the in-focus position 701 becomes equal to the previous focus interval 702.

FIG. 7B illustrates a state of additional image pick-up on an infinite distance side for obtaining a composite image in which the subject 603 is also in focus. The control unit 101 sets an in-focus position for additional image pick-up at a position on an infinite distance side than an in-focus position 401. Specifically, considering the position of the subject 603, the control unit 101 sets an in-focus position 705 on a most infinite distance side to the subject and then sets an in-focus position of another operation of additional image pick-up such that the focus interval between the second in-focus position and the in-focus position 705 becomes equal to the previous focus interval 702.

FIG. 7C illustrates a state in which the control unit 101 sets a new in-focus position in the middle of the in-focus positions of the previous image pick-up to prevent a blurry part from occurring in the subject 602. A focus interval 707 after the additional image pick-up is half the focus interval before the additional image pick-up. In other words, the in-focus position of the additionally picked up image is at the center of the in-focus positions of adjacent images among the previously picked-up images.

The above-described method is merely an example and can be implemented in various modifications. For example, although a user is allowed to select any one of "additional image pick-up on a close distance side", "additional image pick-up on an infinite distance side", and "additional image pick-up with interpolation at an in-focus position" as described above, there is no need to select one. For example, the user can select "additional image pick-up on a close distance side" and "additional image pick-up on an infinite distance side" at the same time. By performing additional image pick-up on both a close distance side and an infinite distance side, a composite image in which both the subject 601 and the subject 603 are in focus can be generated in one operation of additional image pick-up in, for example, the case illustrated in FIG. 6B.

According to the present exemplary embodiment, when an image is picked up for depth composition as described above, even if an unintended composite image is generated, for example, an intended composite image can be obtained by using an image that has already been picked up and performing additional image pick-up, without picking up images again from the beginning.

Although processing from image pick-up to composition is performed in the same apparatus in the exemplary embodiment described above, the disclosure is not limited thereto. For example, image pick-up may be processed by the image pick-up apparatus and the like, and composite processing may be performed using other processing apparatuses such as a personal computer and a server.

Although additional image pick-up on a close distance side and additional image pick-up on an infinite distance side described above are performed on the premise of not exceeding a limit of the optical system 103 or the like, if it is not possible to move focus further to the close distance side and the infinite distance side, the digital camera 100 appropriately gives a warning.

Although the above exemplary embodiment has been described on the premise of implementation in a digital camera, implementation of the exemplary embodiment is not limited to a digital camera. For example, the exemplary embodiment may be implemented in a mobile device or the like in which an image sensor is built in or a network camera or the like that can pick up images.

The aspect of the embodiments can be realized in processing in which a program for realizing one or more functions of the exemplary embodiment described above is supplied to a system or an apparatus via a network or a storage medium and one or more processors of a computer of the system or the apparatus read out and operate the program. The aspect of the embodiments can be realized by a circuit that realizes one or more of the functions (e.g., an ASIC).

According to a configuration of the aspect of the embodiments, an image pick-up apparatus that generates an intended composite image even if an unexpected composite image is generated when depth composition is performed, without picking up images again from the beginning can be provided.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-026720, filed Feb. 18, 2019, which is hereby incorporated by reference herein in its entirety.

What is claimed is:
1. An apparatus comprising:
a sensor configured to pick up a plurality of first images and at least one second image, at least a part of angles of view of the plurality of first images overlapping each other;
a display configured to display a first composite image;
at least one memory configured to store instructions; and
at least one processor in communication with the at least one memory and configured to execute the instructions to:
extract a focused part from each of the plurality of first images to generate the first composite image; and further extract focused parts from the first composite image and the at least one second image to generate a second composite image.

2. The apparatus according to claim 1, wherein the plurality of first images and the at least one second image have different in-focus positions in an optical axis direction.

3. The apparatus according to claim 2, wherein at least some images of the plurality of first images and the at least one second image have an equal interval between the in-focus positions.

4. The apparatus according to claim 1, wherein the sensor picks up the at least one second image after the sensor picks up the plurality of first images.

5. The apparatus according to claim 1, wherein the sensor picks up the at least one second image after the display displays the first composite image.

6. The apparatus according to claim 1,
wherein the at least one processor further executes instructions to acquire a first instruction; and
wherein, after the display displays the first composite image, the first instruction is acquired, and then the sensor picks up the second image.

7. The apparatus according to claim 6,
wherein the at least one processor further executes instructions to further acquire a second instruction; and
wherein a method for picking up, by the sensor, the at least one second image according to the second instruction is determined.

8. The apparatus according to claim 7, wherein the method for picking up the at least one second image is at least one of a method for picking up an image on a closer distance side than a first image on a closest distance side among the plurality of first images, a method for picking up an image on a more infinite distance side than a first image on a most infinite distance side among the plurality of first images, and a method for picking up the at least one second image at an in-focus position between in-focus positions of the plurality of first images.

9. The apparatus according to claim 8, wherein, when the sensor picks up the at least one second image at the in-focus position between the in-focus positions of the plurality of first images, the in-focus position of the at least one second image is set at a center of adjacent in-focus positions of the plurality of first images.

10. An apparatus comprising:
a sensor configured to pick up a plurality of first images and a second image, at least a part of angles of view of the plurality of first images overlapping each other;
a display configured to display a first composite image;
at least one memory configured to store instructions; and
at least one processor in communication with the at least one memory and configured to execute the instructions to:
extract a focused part from each of the plurality of first images to generate the first composite image; and
extract focused parts from the plurality of first images and the second image to generate a second composite image.

11. An apparatus comprising:
a sensor configured to pick up a plurality of images of which at least a part of angles of view overlap each other;
at least one memory configured to store instructions; and
at least one processor in communication with the at least one memory and configured to execute the instructions to:
extract a focused part from each of the plurality of images to generate a composite image,
wherein the sensor further performs additional image pick-up, and
wherein the at least one processor further executes instructions to generate a new composite image by using the composite image generated from the plurality of images and an image picked up in the additional image pick-up.

12. A method comprising:
picking up a plurality of first images and at least one second image, at least a part of angles of view of the plurality of first images overlapping each other;
extracting a focused part from each of the plurality of first images to generate a first composite image;
further extracting focused parts from the first composite image and the at least one second image to generate a second composite image; and
displaying the first composite image.

13. The method according to claim 12, wherein the plurality of first images and the at least one second image have different in-focus positions in an optical axis direction.

14. The method according to claim 12, wherein the picking up picks up the at least one second image after the image sensor picks up the plurality of first images or picks up the at least one second image after the displaying displays the first composite image.

15. A non-transitory computer-readable storage medium which stores a program for causing a computer to perform a method comprising:
picking up a plurality of first images and at least one second image, at least a part of angles of view of the plurality of first images overlapping each other;
extracting a focused part from each of the plurality of first images to generate a first composite image;
further extracting focused parts from the first composite image and the at least one second image to generate a second composite image; and
displaying the first composite image.

16. The non-transitory computer-readable storage medium according to claim 15, wherein the plurality of first images and the at least one second image have different in-focus positions in an optical axis direction.

17. The non-transitory computer-readable storage medium according to claim 15, wherein the picking up picks up the at least one second image after the image sensor picks up the plurality of first images or picks up the at least one second image after the displaying displays the first composite image.

* * * * *